United States Patent
Cheung et al.

(10) Patent No.: US 7,451,205 B2
(45) Date of Patent: Nov. 11, 2008

(54) MULTIMEDIA STREAM PRE-FETCHING AND REDISTRIBUTION IN SERVERS TO ACCOMMODATE MOBILE CLIENTS

(75) Inventors: Gene Cheung, Tokyo (JP); Tina Wong, Sunnyvale, CA (US); Susie J. Wee, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 755 days.

(21) Appl. No.: 09/969,474

(22) Filed: Oct. 1, 2001

(65) Prior Publication Data

US 2003/0065712 A1    Apr. 3, 2003

(51) Int. Cl.
G06F 15/173 (2006.01)
G06F 15/16 (2006.01)

(52) U.S. Cl. ............... 709/224; 709/231; 709/238
(58) Field of Classification Search ........... 709/231, 709/224, 238; 455/440, 450
See application file for complete search history.

(56) References Cited

U.S. PATENT DOCUMENTS

| | | | |
|---|---|---|---|
| 5,572,221 A * | 11/1996 | Marlevi et al. ............ 342/452 |
| 6,215,441 B1 * | 4/2001 | Moeglein et al. ......... 342/357.01 |
| 6,311,065 B1 * | 10/2001 | Ushiki et al. ............... 455/440 |
| 6,377,805 B1 * | 4/2002 | Anvekar et al. ............ 455/436 |
| 6,397,065 B1 * | 5/2002 | Huusko et al. ............ 455/435.2 |
| 6,449,484 B1 * | 9/2002 | Grubeck et al. ............ 455/450 |
| 6,651,105 B1 * | 11/2003 | Bhagwat et al. ............ 709/239 |
| 6,845,398 B1 * | 1/2005 | Galensky et al. ........... 709/231 |
| 2005/0132049 A1 * | 6/2005 | Inoue et al. ................. 709/225 |

* cited by examiner

*Primary Examiner*—Ario Etienne
*Assistant Examiner*—Hussein Elchanti (57) ABSTRACT

A method and system for streaming media data to a mobile client device. Using information such as the previous locations of the mobile client device, a prediction is made of a future location of the client device. A server servicing the predicted location, such as the server closest to the predicted location, is identified. This server is informed of the impending arrival of the mobile device into the area serviced by the server. The server can thus obtain ahead of time the media stream needed for the client, so that the data are available to the client without disruption when the client moves to the predicted location. To account for uncertainty in the prediction, the data can also be directed to other servers that can service the predicted location.

41 Claims, 5 Drawing Sheets

MULTIMEDIA STREAM PRE-FETCHING AND REDISTRIBUTION IN SERVERS TO ACCOMMODATE MOBILE CLIENTS

CROSS REFERENCE TO RELATED APPLICATION

This Application is a Continuation-in-Part of the co-pending, commonly-owned U.S. patent application, Ser. No. 09/898,807, filed Jul. 3, 2001, by J. G. Apostolopoulos et al., and entitled "Method for Handing Off Multiple Description Streaming Media Sessions Between Servers in Fixed and Mobile Streaming Media Systems."

TECHNICAL FIELD

The present claimed invention relates to the field of streaming media. More specifically, the present claimed invention relates to delivering streamed data to mobile clients.

BACKGROUND ART

Networks such as the Internet are primarily designed for delivering static, non-real-time data to fixed clients such as desktop and laptop computers. In comparison, networks such as wireless networks face unique challenges because they need to provide services to clients with greater mobility that may be anywhere within any of the different regions of coverage.

In the case of streaming media services, these challenges are intensified due to the richness of the streamed media data. The volume of streamed media data to be delivered to each client is large and sensitive to delays. The streamed data need to be delivered without interruption and within certain time constraints while the client roams freely among the regions of coverage. Moreover, as the mobile client migrates from one region (cell) to another, the data source (e.g., a server or some other such content provider) and the data delivery path also need to change correspondingly so that the delivery of data to the client is maintained at a satisfactory level.

The challenges faced with streaming media services to mobile clients are further intensified when considering issues like system scalability, which extends service to a larger number of users, and quality-of-service and fault tolerance, which provide mobile users with continuous, uninterrupted streaming media sessions. Other considerations include the load on the data source, network conditions such as congestion along the data delivery path, and the loads at the various nodes (e.g., servers and routers) in the network.

In response to these challenges, a method was developed for distributing multimedia data to servers closest to regions in which high concentrations of interested clients are expected. This method is described in the co-pending, commonly-owned US Patent Application, . Ser. No. 09/895,650, filed Jul. 3, 2001, by J. G. Apostolopoulos et al., and entitled "Method for Assigning a Streaming Media Session to a Server in Fixed and Mobile Streaming Media Systems," hereby incorporated by reference.

According to the referenced method, content (e.g., multimedia data) is placed at servers with anticipated high demand ("hot spots"). These hot spots are identified based on a variety of factors including user statistics. The hot spot evaluation can be repeated to update the list of hot spots as user statistics change.

Generally speaking, the referenced method accomplishes its objectives based on an evaluation of historical information. However, there may be instances not anticipated by the historical information. Accordingly, what is needed is a method and/or system that does not rely solely on historical information to guide the distribution of multimedia data to a mobile client. The present invention provides a novel solution to this need.

DISCLOSURE OF THE INVENTION

The present invention provides a method and system for streaming multimedia data to a mobile client. In particular, the present invention provides a method and system for streaming multimedia data to a mobile client by predicting a future location of the client and placing the multimedia data on the server(s) that service that location ahead of the client's arrival at that location.

In its various embodiments, the present invention provides a method (and system thereof) for proactively predicting client mobility, and for distributing multimedia data to servers in response to the prediction. In accordance with the present invention, a fairly accurate estimate of the client's future position is determined using any of a variety of different means. In one embodiment, using previous position information, the client's rate and direction of travel can be determined, and a projected position at a future time (or as a function of time) can be estimated from this information. Similarly, information regarding which servers were previously in communication with the client device can be used to predict a position at a future time or as a function of time. Alternatively, using an application interface on the client device, the client can identify an ultimate destination, a planned course of travel, and the mode of travel. There are many other ways that can be used to predict the client's future position(s) at different time intervals.

Having determined a future position of the client (in particular, the next position of the client), a server closest to that position can be identified. Because there may be an error associated with the predicted position, a neighborhood of servers essentially centered around the server closest to the predicted position can also be identified. The number of servers included in the neighborhood is a function of the confidence in the prediction as well as other factors such as quality of service and the current loads across the servers, the characteristics of the server (e.g., the amount of memory available), and the network conditions (e.g., network loads, available bandwidth, and data packet loss rate). There is a fundamental tradeoff between efficiency and redundancy: with fewer servers in the neighborhood, the overall efficiency of the system is greater, but the level of redundancy is reduced, potentially affecting the quality of the data delivered to the client. The number of servers included in the neighborhood is a design parameter that can be adjusted based on, for example, the service-level agreement in place between the client and the service provider.

After identifying the server(s) that can service the future (e.g., next) position of the client, the data stream(s) requested by the client can be prefetched and distributed to those servers ahead of the arrival of the client. In one embodiment, once the server(s) are identified, they are alerted to the potential arrival of the client, either by the server currently in communication with the client or by a central source. The server(s) can then pull the requested data stream(s) prior to the client's arrival, either from a content source or from another server (such as the server currently servicing the client). Alternatively, with or without an alert, the requested data stream(s) can be pushed to the server(s) from either the content source or another server.

In one embodiment, the data stream comprises complementary multiple description bitstreams. However, the present invention addresses the general placement and migration of media streams and is independent of the media coding method.

These and other technical advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODES FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing terms such as "receiving," "determining," "identifying," "alerting," "directing," "predicting," "informing" or the like, refer to the actions and processes of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present Invention

Figure 1:
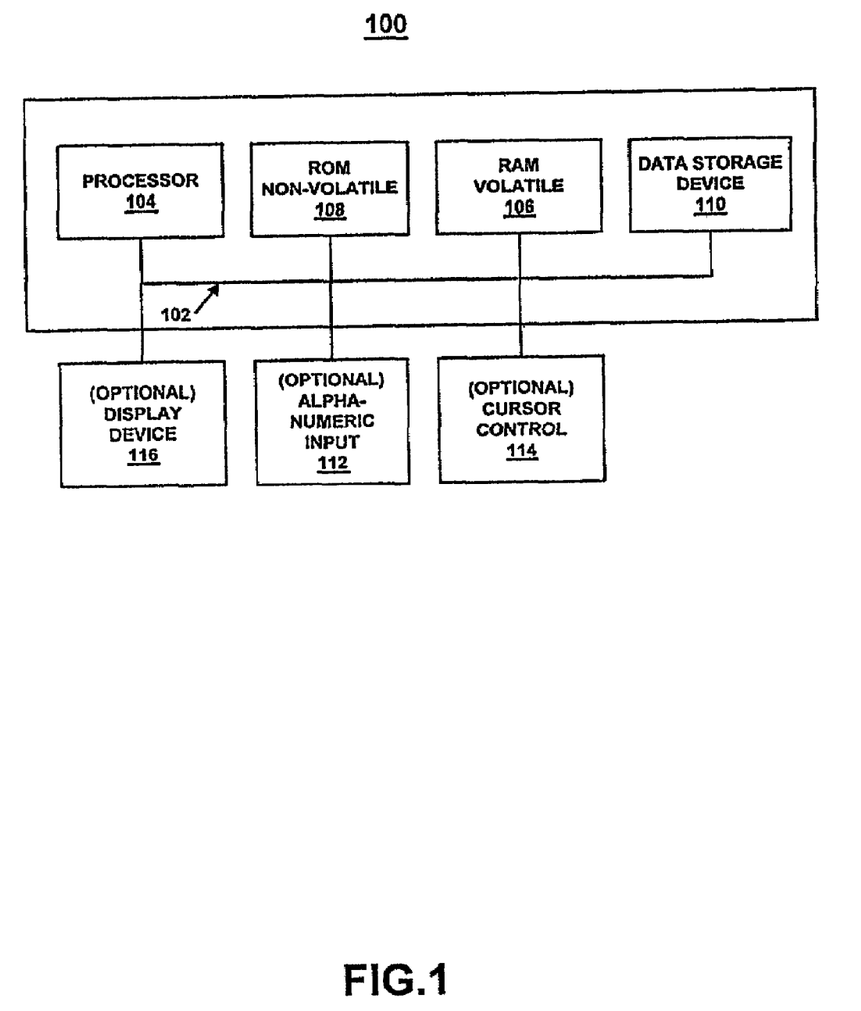
FIG. 1 is a block diagram of an exemplary computer system used to perform steps of the present method in accordance with various embodiments of the present claimed invention.

With reference now to FIG. 1, portions of the present method and system are comprised of computer-readable and computer-executable instructions which reside, for example, in computer-usable media of a computer system. FIG. 1 illustrates an exemplary computer system 100 used in accordance with one embodiment of the present invention. It is appreciated that system 100 of FIG. 1 is exemplary only and that the present invention can operate on or within a number of different computer systems including general purpose networked computer systems, embedded computer systems, routers, switches, server devices, client devices, various intermediate devices/nodes, stand alone computer systems, and the like. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity. Additionally, portions of the present embodiment are well suited to operating in conjunction with various mobile clients such as, for example, a cell phone, personal digital assistant (PDA), laptop computer, pager, and the like.

System 100 of FIG. 1 includes an address/data bus 102 for communicating information, and a central processor unit 104 coupled to bus 102 for processing information and instructions. System 100 also includes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112 including alphanumeric and function keys coupled to bus 102 for communicating information and command selections to central processor unit 104. System 100 also optionally includes an optional cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 of FIG. 1 may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands.

Multiple Description Coding of Media Data

In general, the present invention provides a method and system for streaming multimedia data to a mobile client. In particular, the present invention provides a method and system for streaming multimedia data to a mobile client by predicting a future location of the client and placing the multimedia data on the server(s) that service that location ahead of the client's arrival at that location.

Figure 2:
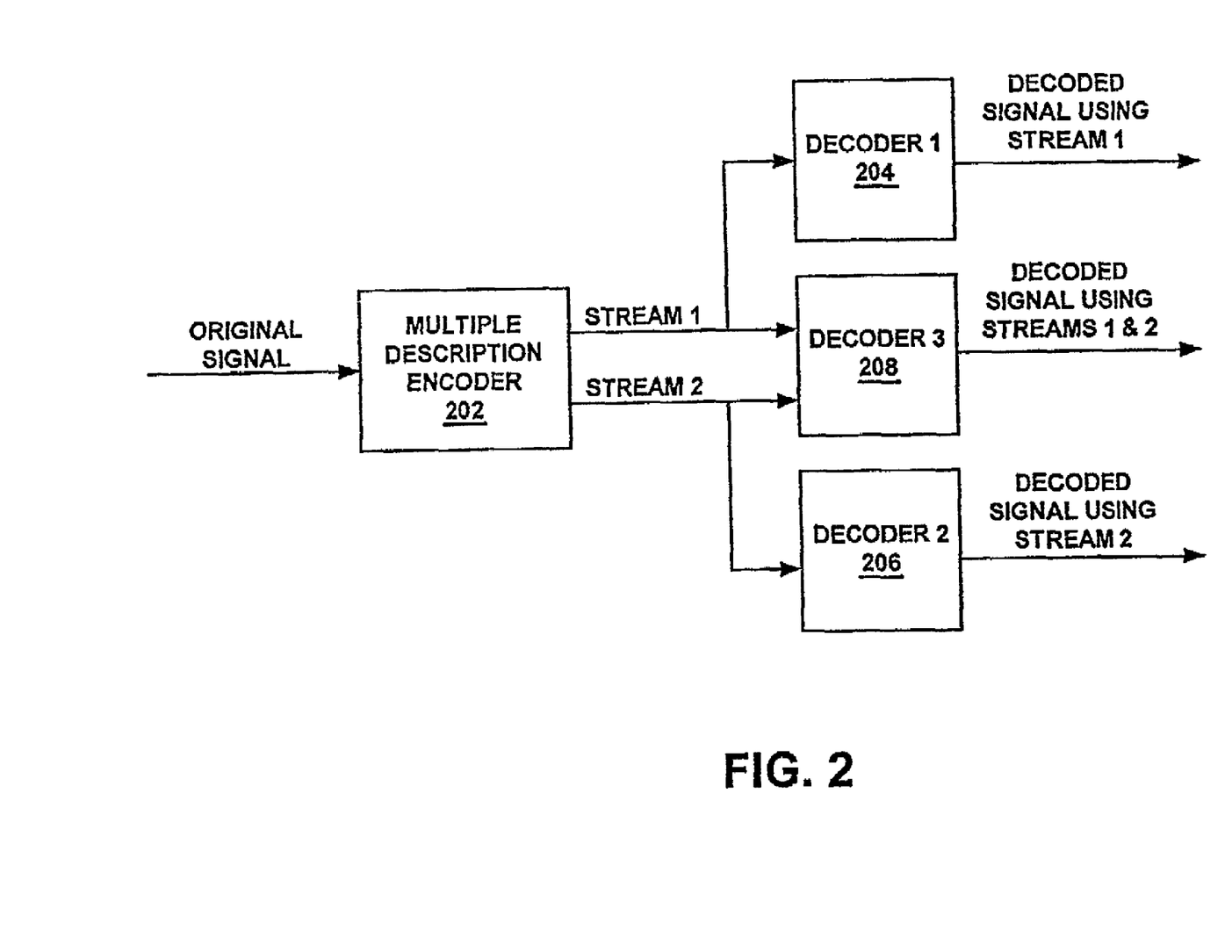
FIG. 2 is a block diagram illustrating multiple description coding of media data as employed in accordance with various embodiments of the present claimed invention.

With reference to FIG. 2, in one embodiment, the multimedia data comprise complementary multiple description bitstreams. However, it is understood that the present invention covers the general placement and migration of media data on servers and is independent of the method of coding or delivery such data. Of course, buffering and downloading are allowed, and various degrees of buffering can be accommodated in this system; thus, this system supports both live and buffered media streams.

FIG. 2 illustrates complementary multiple description coding of media data as employed with various embodiments of the present invention. Complementary multiple description bitstreams are further described in commonly-owned, co-pending U.S. patent application Ser. No. 09/899,622, entitled "Method and System for Delivering Streaming Media to Fixed Clients or Mobile Clients with Multiple Description Bitstreams," filed Jul. 3, 2001, to J. G. Apostolopoulos et al., and hereby incorporated by reference.

For purposes of clarity and brevity, the following discussion and examples are described in the context of video data. However, it is understood that the present invention is well suited to use with video-based data, audio-based data, speech-based data, image-based data, web page-based data, graphic data and the like.

Multiple description coding (MDC) refers to one form of compression where the goal is to code an incoming signal into a number of separate bitstreams, where the multiple bitstreams are often referred to as multiple descriptions. These separate bitstreams have the property that they are all independently decodable from one another. Specifically, if a decoder receives any single bitstream, it can decode that bitstream to produce a useful signal (without requiring access to any of the other bitstreams).

MDC has the additional property that the quality of the decoded signal improves as more bitstreams are accurately received. For example, assume that a video is coded with MDC into a total of N streams. As long as a decoder receives any one of these N streams it can decode a useful version of the video. If the decoder receives two streams it can decode an improved version of the video as compared to the case of only receiving one of the streams. This improvement in quality continues until the receiver receives all N of the streams, in which case it can reconstruct the maximum quality.

As shown in FIG. 2, a multiple description encoder 202 codes an original signal into two streams, referred to as stream 1 and stream 2. In the example of FIG. 2, there are three decoders 204, 206, and 208. Each of the decoders 204, 206, and 208 receives different bitstreams. Decoder 1 204 receives only stream 1 and decodes that stream to produce usable video. Decoder 2 206 receives only stream 2 and decodes that stream to produce usable video. Decoder 3 208 receives both stream 1 and stream 2 and decodes both streams to produce higher quality video than either decoder 1 204 or decoder 2 206.

Mobile Streaming Media System

Figure 3:
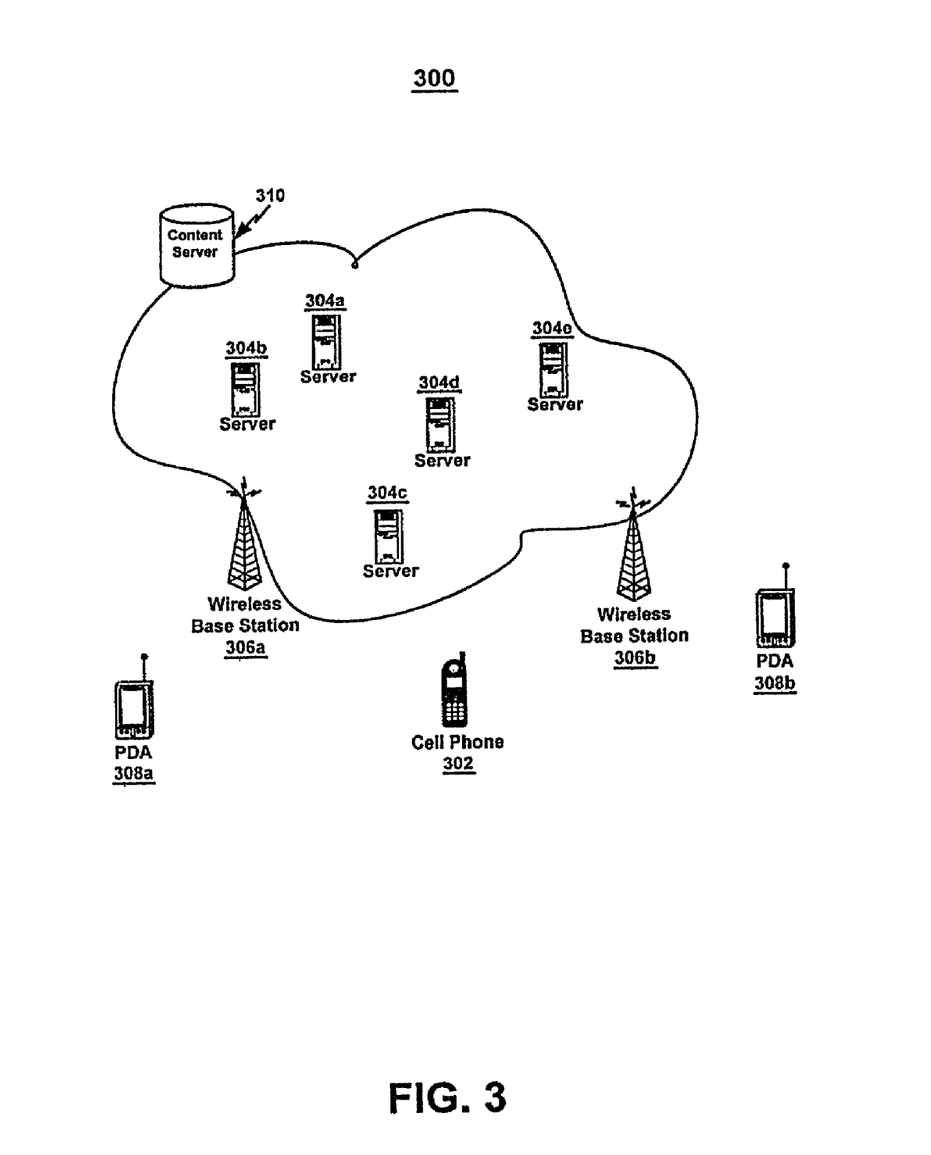
FIG. 3 illustrates a mobile client system employed in accordance with various embodiments of the present claimed invention.

With reference now to FIG. 3, a system 300 that delivers streaming media to mobile clients over wired and/or wireless networks in accordance with one embodiment of the present invention is shown. In one embodiment, system 300 consists of one or more servers (304a-304e), one or more wireless base stations (306a and 306b), and one or more mobile clients (e.g., cell phone 302 and/or PDAs 308a and 308b) as shown in FIG. 3. A content server 310 (content source) may also form a portion of system 300. The system of the present invention may include a greater or lesser number of components than are specifically illustrated in the embodiment of FIG. 3. For example, a number of routers may be employed to distribute information from content server 310 to the various servers 304a-304e.

The term "server" is intended to encompass a device functionally resembling a computer (e.g., having computation ability, memory, and/or connectivity capability). A typical server according to the definition as used in the present application may include, but is not limited to, any computer (e.g., mainframe, corporate server, personal computer, laptop, PDA, and the like). In various other embodiments of the present invention, the term "server" is intended to encompass a device not typically considered a computer but having similar capabilities. In such an embodiment, the server is comprised, for example, of an advanced cell phone.

Furthermore, it should be noted the present invention is well suited to use in any of a variety of wired and/or wireless networks serving mobile clients, and also in the various combinations thereof. For example, embodiments of the present invention are well suited to use in: wired and wired networks (e.g., a wired network infrastructure also having a wired connection to the mobile client); wired and wireless networks (e.g., a wired network infrastructure having a wireless connection to the mobile client); wireless and wired networks (e.g., a wireless network infrastructure having a wired connection to the mobile client); and wireless and wireless networks (e.g., a wireless network infrastructure also having a wireless connection to the mobile client). In addition, the methods of the present invention are also applicable if all of the links are wireless, as in the case of an ad-hoc wireless network where some of the nodes are acting as servers and others as clients. Note that a node may act as both a server (source of information) and a client (sink of information) at the same time.

Multimedia Stream Pre-fetching and Redistribution in Servers

Figure 4:
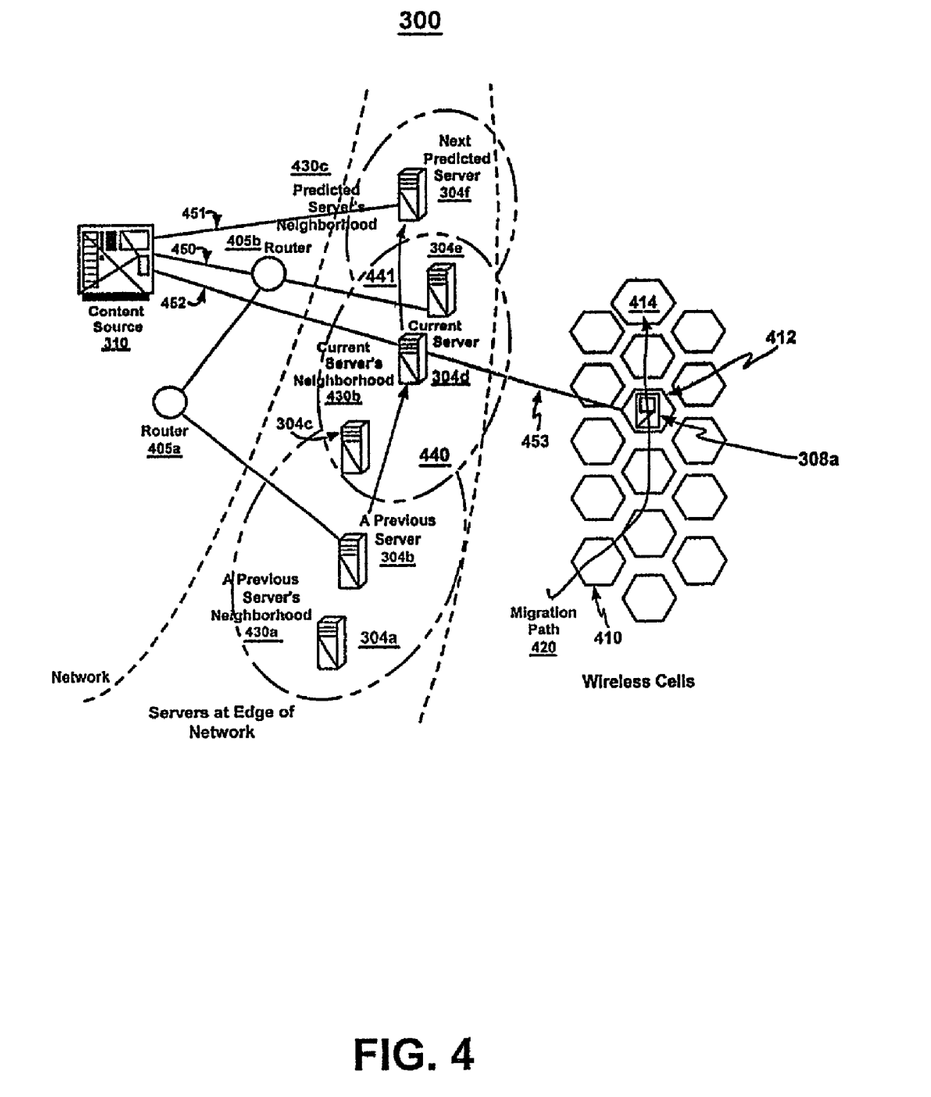
FIG. 4 illustrates prefetching and distribution of media data in a mobile client system in accordance with various embodiments of the present claimed invention.

FIG. 4 illustrates prefetching and distribution of media data in a mobile client system 300 in accordance with various embodiments of the present invention. As described above, the present invention is well suited to use in any of a variety of wired and/or wireless networks serving mobile clients, and also in the various combinations thereof.

In the embodiment of FIG. 4, system 300 includes a content source 310 (content server) and a number of servers 304a-304f. Content source 310 can communicate with (e.g., provide data to and receive data from) the servers using either a wired or wireless network infrastructure. For example, content source 310 can provide multimedia data to servers (e.g., servers 304b and 304e) via the wired infrastructure 450 including routers 405a and 405b according to means known in the art. Similarly, content source 310 can provide multimedia data to servers (e.g., servers 304d and 304f) via wireless infrastructure 451 and 452 according to means known in the art. Alternatively, one server can communicate the data to another server, either directly or through the network. That is, for example, a previous server 304b can forward the multimedia data to the current server 304d via a wired or wireless link 440, or via routers 405a and 405b.

System 300 also comprises a number of wireless cells exemplified by cells 410, 412 and 414. The mobile client device 308a is free to roam within the cells and from cell to cell. An exemplary path taken by mobile client device 308a is illustrated as migration path 420. The cell in which the mobile client device 308a is currently positioned is identified as cell 412.

Client device 308a receives streamed multimedia data from different servers as it moves along migration path 420. Initially, client device receives the data stream from a previous server 304b and then from current server 304d. Typically, the multimedia data are delivered to client device 308a wirelessly (e.g., via the wireless signal 453); however, the present invention is well suited for wired delivery of data to mobile client 308a.

In accordance with the present invention, as client device 308a moves from one wireless cell to the next (e.g., from cell 410 to cell 412), its future position (e.g., cell 414) is predicted and the requested content (multimedia data) is prefetched to the server (e.g., server 304f) that can service the predicted position. If the future position of client device 308a can be fairly accurately predicted, it may be possible to prefetch data only to a single server. If, however, the prediction of the future position of client device 308a is subject to significant error, then the data are prefetched to a number of servers (a neighborhood of servers) so that a larger area, encompassing the potential position of client device 308a, can be serviced. For example, multimedia data are also prefetched to server 304e in the neighborhood 430c of server 304f if there is some uncertainty with regard to whether client device 308a will be in cell 414 or an adjacent cell.

Note that neighborhoods can overlap such that a server may be considered a member of more than one neighborhood. For example, server 304e may be in neighborhood 430b and in neighborhood 430c. Of course, if a server already contains the requested content (multimedia data), then there is no need to prefetch the data to that server. For instance, server 304e may have received the data stream in a prefetch that occurred prior to the movement of client device 308a into cell 412, and therefore server 304e may not need to prefetch data in anticipation of the movement of client device 308a into cell 414. Thus, unnecessary or duplicate data transfers are avoided.

In one embodiment, the server 304f selected to service the predicted position of client device 308a is the server that is closest to the predicted position (cell 414). Generally, the server selected is the server topologically closest to the base station(s) of cell 414. However, in the present invention, "closeness" can also be weighted by the current network conditions so that a server with congested links may appear "far" from cell 414 even though it may be topologically close.

When client device 308a moves during a streaming session, it is necessary to hand off the session between base stations (e.g., between base stations 306a and 306b of FIG. 3) and between servers (e.g., between servers 304b and 304d of FIG. 4). As used herein, a "session" is viewed from the client's perspective and thus refers to the continuous streaming of media data to the client, although different base stations or servers may be needed to accomplish this. Different approaches for handing off sessions between base stations and between servers can be used in accordance with the present invention. Various approaches for accomplishing handoffs are described in the co-pending, commonly-owned U.S. patent application, Ser. No. 09/898,650, filed Jul. 3, 2001, by J. G. Apostolopoulos et al., and entitled "System and Method for Receiving Multiple Description Media Streams Between Servers in Fixed and Mobile Streaming Media Systems," hereby incorporated by reference.

Figure 5:
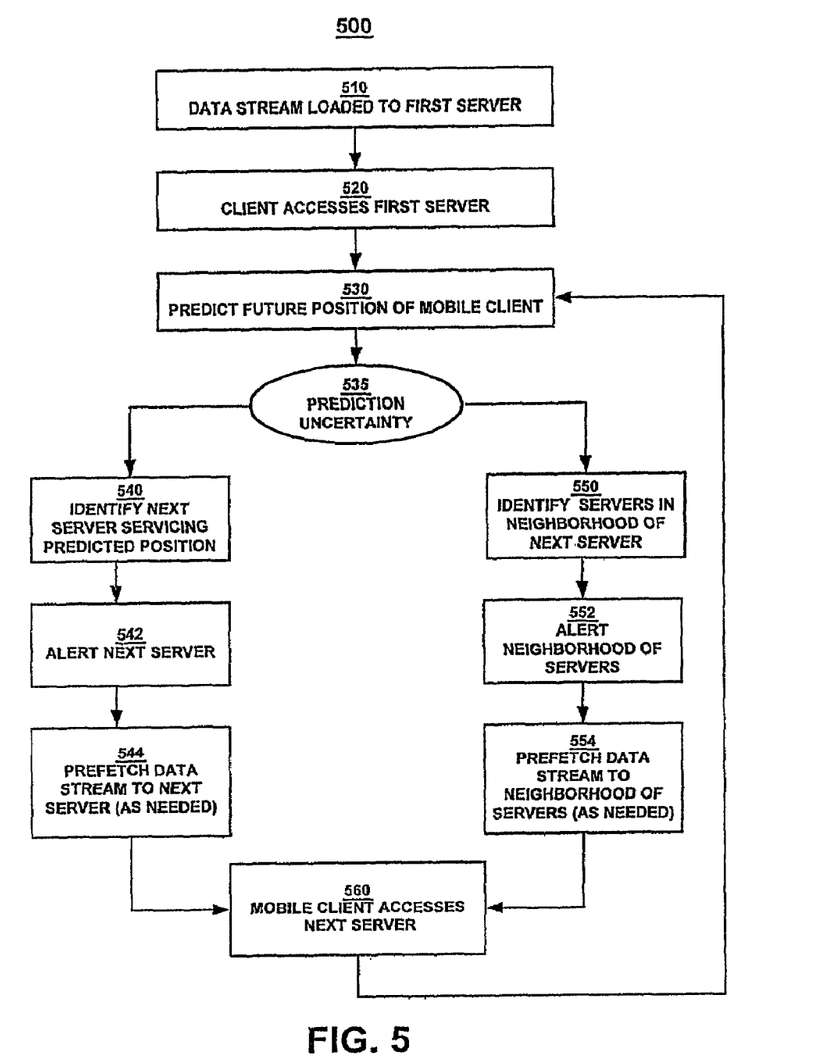
FIG. 5 is a flowchart of the steps in a process for prefetching and distributing media data in accordance with various embodiments of the present claimed invention.

FIG. 5 is a flowchart 500 of the steps in a process for prefetching and distributing media data in accordance with various embodiments of the present invention. Flowchart 500 includes processes of the present invention which, in one embodiment, are carried out by a processor (e.g., processor 104 of FIG. 1) under the control of computer-readable and computer-executable instructions. The computer-readable and computer-executable instructions reside, for example, in data storage features such as computer usable volatile memory 106, computer usable non-volatile memory 108, and/or data storage device 110 of FIG. 1.

Although specific steps are disclosed in flowchart 500 of FIG. 5, such steps are exemplary. That is, the present invention is well suited to performing various other steps or variations of the steps recited in flowchart 500. It is appreciated that the steps in flowchart 500 may be performed in an order different than presented, and that not all of the steps in flowchart 500 may be performed.

With reference to both FIG. 4 and FIG. 5, the exemplary steps in flowchart 500 are described. It is anticipated that the steps in flowchart 500 will be performed for each client device on a client-by-client basis. In step 510, the multimedia data stream are loaded to a first server (e.g., server 304d) from a source such as previous server 304b or content source 310. Content source 310 may be the original source of the data.

Server 304d may pull the data from a source or the data may be pushed to server 304d. The multimedia data stream loaded into server 304d may comprise the entire set of streaming data requested by client device 308a or it may comprise some portion of that data. Server 304d may be the first server in communication with client device 308a at the beginning of a streaming session, or server 304d may have been handed the streaming session by another server (e.g., previous server 304b).

In step 520, multimedia data are streamed from current server 304d to client 308a.

In step 530, the next (future) position (e.g., cell 414) of client device 308a is predicted. The prediction may be executed by current server 304d, content source 310, or virtually any of the other intelligent devices in system 300. A displacement vector can be determined based on the predicted location (cell 414) relative to the current location (cell 412).

In one embodiment, using previous position information, the rate and direction of travel of client 308a can be determined, and a projected position at a future time (or as a function of time) can be estimated from this information. Similarly, information regarding which servers were previously in communication with client device 308a can be used to predict a position at a future time or as a function of time. Alternatively, using an application interface on client device 308a, the user can identify an ultimate destination, a planned course of travel, and the mode of travel, as well as other information that might aid in the prediction of projected position. There are many other ways that can be used to predict the client's next or future position(s).

In step 535, based on the amount of uncertainty in the prediction, a single server can be selected to receive prefetched multimedia data, or a neighborhood comprising multiple servers can be selected to receive the prefetched data. The number of servers included in the neighborhood is a function of the confidence in the prediction as well as other factors such as quality of service and the current loads across the servers. Other factors that can be considered include server characteristics such as the amount of storage space (e.g., memory) available, and network conditions such as the load on the network, the available bandwidth, and the data packet loss rate. There is a fundamental tradeoff between efficiency and redundancy: with fewer servers in the neighborhood, the overall efficiency of the system is greater, but the level of redundancy is reduced, potentially affecting the quality of the data delivered to the client. The number of servers included in the neighborhood is a design parameter that can be adjusted based on, for example, the service-level agreement in place between the client and the service provider.

It is appreciated that other factors can be considered in the decision whether to select a single server or multiple servers. For example, if a single server is selected but that server is or may be experiencing a high load, then one or more additional servers may be also selected in order to provide a backup to the selected server should it be too busy when needed by client device 308a.

If a single server is selected, then flowchart 500 proceeds to step 540. If multiple servers are selected, then flowchart 500 proceeds to step 550.

In step 540, a server (e.g., server 304f) that has the capability to service cell 414 is identified and selected. In one embodiment, server 304f is the server located topologically closest to cell 414. However, as described above, a different server may be selected based on network conditions such as the loads already placed on server 304f.

In step 542, in one embodiment, prefetch information (e.g., an alert) is sent to server 304f to alert that server to the anticipated arrival of client device 308a. The source of the alert can be content source 310, current server 304d, or any of the other intelligent devices in the system 300.

In step 544, the multimedia data stream requested by client device 308a, or a portion of that data stream, is obtained by server 304f. If the data are already present on server 304f, as explained above, then there is no need to prefetch the data to server 304f, thus avoiding unnecessary data transfers. In one embodiment, the server 304f is queried to determine whether the server has the media data. In one embodiment, the data are pushed to server 304f from a source. In another embodiment, the data are pulled from a source by server 304f, perhaps in response to the alert of step 542. The data can be obtained from the original source of the data, which may be content source 310, or from current server 304d.

In step 550, multiple servers (e.g., servers 304e and 304f) in a neighborhood of servers (e.g., neighborhood 430c) that have the capability to service cell 414 and adjacent cells are identified and selected based, for example, on the uncertainty in the predicted position of client device 308a or other factors as explained above. In step 552, in one embodiment, the selected servers are alerted to the anticipated arrival of client device 308a in a manner like that described in step 542. In step 554, the multimedia data stream requested by client device 308a, or a portion of that data stream, is obtained by the multiple servers (e.g., servers 304e and 304f) in a manner like that described in step 544. Note that servers in the predicted neighborhood do not each need to receive the same quality of data. Servers in the predicted neighborhood can prefetch data of varying quality depending on the optimization of factors such as storage and quality. For example, servers that have a lesser probability of contacting client device 308a can prefetch content of lower quality.

In step 560, client device 308a accesses server 304f or another server in neighborhood 430c depending on its actual position. Flowchart 500 then returns to step 530 to predict the next position of client device 308a, and the process is repeated until client device 308a has received the requested multimedia data stream in entirety or until the session is terminated for some other reason.

Thus, the present invention provides a method and system for streaming multimedia data to a mobile client. In particular, the present invention provides a method and system for streaming multimedia data to a mobile client by predicting a future location of the client and placing the multimedia data on the server(s) that service that location ahead of the client's arrival at that location.

Note that the method of the present invention includes the following base cases. When the prediction of the future (next) position of a client device is perfect, the size of a neighborhood is zero and no redundancy of data across multiple servers is needed. When the mobility of a client device cannot be predicted, or when the client device is stationary or essentially stationary, the displacement vector is zero and the data streams are simply distributed to the current server, or to the current server and its neighborhood.

When the size of the neighborhood is zero and the displacement vector is zero, the method of the present invention defaults to the case described in the above-referenced U.S. patent application Ser No. 09/895,650, filed Jul. 3, 2001, by J. G. Apostolopoulos et al., and entitled "Method for Assigning a Streaming Media Session to a Server in Fixed and Mobile Streaming Media Systems." That is, the method of the present invention can be used both proactively and reactively.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A method for streaming media data to a mobile client device, said method comprising:
receiving information sufficient for determining a predicted position of said mobile client device;
identifying a server that will stream said media data to an area including said predicted position upon said mobile client device arriving in said area;
identifying a number of neighborhood of servers that are centered around and include said identified server that are selected to receive said media data, wherein said identifying further comprises identifying the number of servers to be included in said neighborhood of servers according to dynamic server loads enabling the number of servers included in said neighborhood to vary based on said dynamic server loads and based on an amount of uncertainty in the determined predicted position;
informing said neighborhood of servers about said mobile client device, wherein said informing comprises said neighborhood of servers obtaining from a source server at least a portion of said media data not previously obtained by said identified server, wherein said obtaining occurs prior to said mobile client device arriving at said predicted position, and wherein said source server is not required to be one of said neighborhood of servers; and selecting a server from said neighborhood of servers to stream said media data to said mobile client device with said mobile client device in said area serviced by said selected server.

2. The method as recited in claim 1 wherein said method further comprises:
querying said selected server to determine whether said selected server has said media data.

3. The method as recited in claim 1 wherein said media comprises complementary multiple description bitstreams.

4. The method as recited in claim 1 wherein said information sufficient for determining predicted position of said mobile client, said device is provided by said mobile client device.

5. The method as recited in claim 1 wherein said information sufficient for determining predicted position of said mobile client, said device comprises a rate of travel and a direction of travel of said mobile client device.

6. The method as recited in claim 1 wherein said information sufficient for determining said predicted position of said mobile client device comprises identities of other servers previously in communication with said mobile client device.

7. The method as recited in claim 1 wherein said selected server is a server closest to said predicted position.

8. The method as recited in claim 1 further comprising:
identifying said servers to be included in said neighborhood of servers according to quality of service criteria.

9. The method as recited in claim 1 further comprising:
identifying said servers to be included in said neighborhood of servers according to server characteristics.

10. The method as recited in claim 1 further comprising:
identifying said servers to be included in said neighborhood of servers according to network conditions.

11. The method as recited in claim 1 wherein said source server comprises an original source of said media data.

12. The method as recited in claim 1 wherein said source server comprises another server.

13. The method as recited in claim 1 wherein said informing comprises:
alerting said selected server to said mobile client device, wherein in response to said step of alerting said selected server pulls said media data from said source server.

14. The method as recited in claim 1 wherein said informing comprises:
directing said media data to be pushed from said source server to said selected server.

15. A computer system communicatively coupled to a plurality of servers, said computer system comprising:
a bus;
a memory unit coupled to said bus; and
a processor coupled to said bus, said processor for executing a method for streaming media data to a mobile client device, said method comprising:
receiving information sufficient for determining a predicted position of said mobile client device;
identifying a server that will stream said media data to an area including said predicted position upon said mobile client device arriving in said area;
identifying a number of neighborhood of servers that are centered around and include said identified server that are selected to receive said media data,
wherein said identifying further comprises identifying the number of servers to be included in said neighborhood of servers according to dynamic server loads enabling the number of servers included in said neighborhood to vary based on said dynamic server loads and based on an amount of uncertainty in the determined predicted position;
informing said neighborhood of servers about said mobile client device,
wherein said informing comprises said neighborhood of servers obtaining from a source server at least a portion of said media data not previously obtained by said identified server, wherein said obtaining occurs prior to said mobile client device arriving at said predicted position, and wherein said source server is not required to be one of said neighborhood of servers; and
selecting a server from said neighborhood of servers to stream said media data to said mobile client device with said mobile client device in said area serviced by said selected server.

16. The computer system of claim 15 wherein said selecting further comprises:
weighting communication links between said servers and said mobile client device according to the amounts of congestion on said communication links and selecting said selected server according to results of said weighting.

17. The computer system of claim 15 wherein said media comprises complementary multiple description bitstreams.

18. The computer system of claim 15 wherein said information sufficient for determining predicted position of said mobile client, said device is provided by said mobile client device.

19. The computer system of claim 15 wherein said information sufficient for determining predicted position of said mobile client, said device comprises a rate of travel and a direction of travel of said mobile client device.

20. The computer system of claim 15 wherein said information sufficient for determining said predicted position of said mobile client device comprises identities of other servers previously in communication with said mobile client device.

21. The computer system of claim 15 wherein said method further comprises:
identifying said servers to be included in said neighborhood of servers according to quality of service criteria.

22. The computer system of claim 15 wherein said method further comprises:
identifying said servers to be included in said neighborhood of servers according to server characteristics.

23. The computer system of claim 15 wherein said method further comprises:
identifying said servers to be included in said neighborhood of servers according to network conditions.

24. The computer system of claim 15 wherein said selected server obtains said portion of said media data from an original source server of said media data.

25. The computer system of claim 15 wherein said selected server obtains said portion of said media data from another server.

26. The computer system of claim 15 wherein said method further comprises:
alerting said selected server to said mobile client device, wherein in response to said step of alerting said selected server pulls said media data from said source server.

27. The computer system of claim 15 wherein said method further comprises:
directing said media data to be pushed from said source server to said selected server.

28. A computer readable medium having computer readable code stored thereon for causing a computer system to perform a method for streaming media data to a mobile client device comprising:

receiving information sufficient for determining a predicted position of said mobile client device;

identifying a server that will stream said media data to an area including said predicted position upon said mobile client device arriving in said area;

identifying a number of neighborhood of servers that are centered around and include said identified server that are selected to receive said media data, wherein said identifying further comprises identifying the number of servers to be included in said neighborhood of servers according to dynamic server loads enabling the number of servers included in said neighborhood to vary based on said dynamic server loads and based on an amount of uncertainty in the determined predicted position;

informing said neighborhood of servers about said mobile client device, wherein said informing comprises said neighborhood of servers obtaining from a source server at least a portion of said media data not previously obtained by said identified server, wherein said obtaining occurs prior to said mobile client device arriving at said predicted position, and wherein said source server is not required to be one of said neighborhood of servers; and selecting a server from said neighborhood of servers to stream said media data to said mobile client device with said mobile client device in said area serviced by said selected server.

29. The computer-usable medium of claim 28 wherein said computer-readable program code embodied therein causes a computer system to perform a method for streaming media data to a mobile client device comprising:

querying said selected server to determine whether said selected server has said media data.

30. The computer-usable medium of claim 28 wherein said media comprises complementary multiple description bitstreams.

31. The computer-usable medium of claim 28 wherein said information sufficient for determining said predicted position of said mobile client device is provided by said mobile client device.

32. The computer-usable medium of claim 28 wherein said information sufficient for determining said predicted position of said mobile client device comprises a rate of travel and a direction of travel of said mobile client device.

33. The computer-usable medium of claim 28 wherein said information sufficient for determining said predicted position of said mobile client device comprises identities of other servers previously in communication with said mobile client device.

34. The computer-usable medium of claim 28 wherein said selected server is a server closest to said predicted position.

35. The computer-usable medium of claim 28 wherein said computer-readable program code embodied therein causes a computer system to perform a method for streaming media data to a mobile client device comprising:

identifying said servers to be included in said neighborhood of servers according to quality of service criteria.

36. The computer-usable medium of claim 28 wherein said computer-readable program code embodied therein causes a computer system to perform a method for streaming media data to a mobile client device comprising:

identifying said servers to be included in said neighborhood of servers according to server characteristics.

37. The computer-usable medium of claim 28 wherein said computer-readable program code embodied therein causes a computer system to perform a method for streaming media data to a mobile client device comprising:

identifying said servers to be included in said neighborhood of servers according to network conditions.

38. The computer-usable medium of claim 28 wherein said selected server obtains said portion of said media data from an original source server of said media data.

39. The computer-usable medium of claim 28 wherein said selected server obtains said portion of said media data from another server.

40. The computer-usable medium of claim 28 wherein said computer-readable program code embodied therein causes a computer system to perform a method for streaming media data to a mobile client device comprising:

alerting said selected server to said mobile client device, wherein in response to said step of alerting said selected server pulls said media data from said source server.

41. The computer-usable medium of claim 28 wherein said computer-readable program code embodied therein causes a computer system to perform a method for streaming media data to a mobile client device comprising:

directing said media data to be pushed from said source server to said selected server.

* * * * *

UNITED STATES PATENT AND TRADEMARK OFFICE
CERTIFICATE OF CORRECTION

| | | |
|---|---|---|
| PATENT NO. | : 7,451,205 B2 | Page 1 of 1 |
| APPLICATION NO. | : 09/969474 | |
| DATED | : November 11, 2008 | |
| INVENTOR(S) | : Gene Cheung et al. | |

It is certified that error appears in the above-identified patent and that said Letters Patent is hereby corrected as shown below:

In column 11, line 12, in Claim 4, after "determining" insert -- said --.

In column 11, line 13, in Claim 4, after "client" delete ", said".

In column 11, line 16, in Claim 5, after "determining" insert -- said --.

In column 11, line 17, in Claim 5, after "client" delete ", said".

In column 12, line 28, in Claim 18, after "determining" insert -- said --.

In column 12, line 29, in Claim 18, after "client" delete ", said".

In column 12, line 32, in Claim 19, after "determining" insert -- said --.

In column 12, line 33, in Claim 19, after "client" delete ", said",

Signed and Sealed this

Fourth Day of August, 2009

JOHN DOLL
*Acting Director of the United States Patent and Trademark Office*